United States Patent [19]

Manning

[11] 4,131,209
[45] Dec. 26, 1978

[54] VEHICLE ENTRANCE RAMP

[76] Inventor: Donald L. Manning, 4002 Normanwood Dr., Orchard Lake, Mich. 48033

[21] Appl. No.: 825,752

[22] Filed: Aug. 18, 1977

[51] Int. Cl.² .............................................. B65G 67/02
[52] U.S. Cl. ...................................... 214/85; 105/433; 105/449; 280/163
[58] Field of Search ...................... 214/85, 85.1, 83.24, 214/DIG. 13; 296/26; 280/163–166; 105/430–433, 449; 14/72.5, 71.7, 71.1, 71.3

[56] References Cited

U.S. PATENT DOCUMENTS

| | | | |
|---|---|---|---|
| 1,717,303 | 6/1929 | Barclay | 214/85 |
| 2,797,104 | 6/1957 | Drobney et al. | 280/166 |
| 3,730,361 | 5/1973 | Haynes | 214/85 |
| 4,022,337 | 5/1977 | Eichenhofer et al. | 214/DIG. 13 |
| 4,027,807 | 6/1977 | Thorley | 214/DIG. 13 |
| 4,058,228 | 11/1977 | Hall | 105/433 X |

Primary Examiner—Albert J. Makay
Assistant Examiner—Donald W. Undergood

Attorney, Agent, or Firm—Reising, Ethington, Barnard, Perry & Brooks

[57] ABSTRACT

A motor bus has a side door at its forward end which when opened accommodates laterally outward extension of a ramp from a normally stowed position below the floor of the bus, a portion of the ramp adjacent its outer end serving as a step for entering the bus when the ramp is in its stowed position. Extending longitudinally of the ramp and journalled therein at its outward end is a lead screw which is rotatively driven by a rotary power motor mounted to the inner end of the ramp. A nut threadedly engaging the screw is hingedly mounted to the lower end of a step riser which is hinged at its upper end to the bus floor so as to swing up to a position co-planar with the ramp when the ramp is fully extended. A bell crank having an arm underlying the ramp is actuatable by a fluid motor to swing the inner end of the ramp and lower end of the riser upwardly to their co-planar relation when the motor comes into abutment with the nut during outward extending movement of the ramp.

6 Claims, 8 Drawing Figures

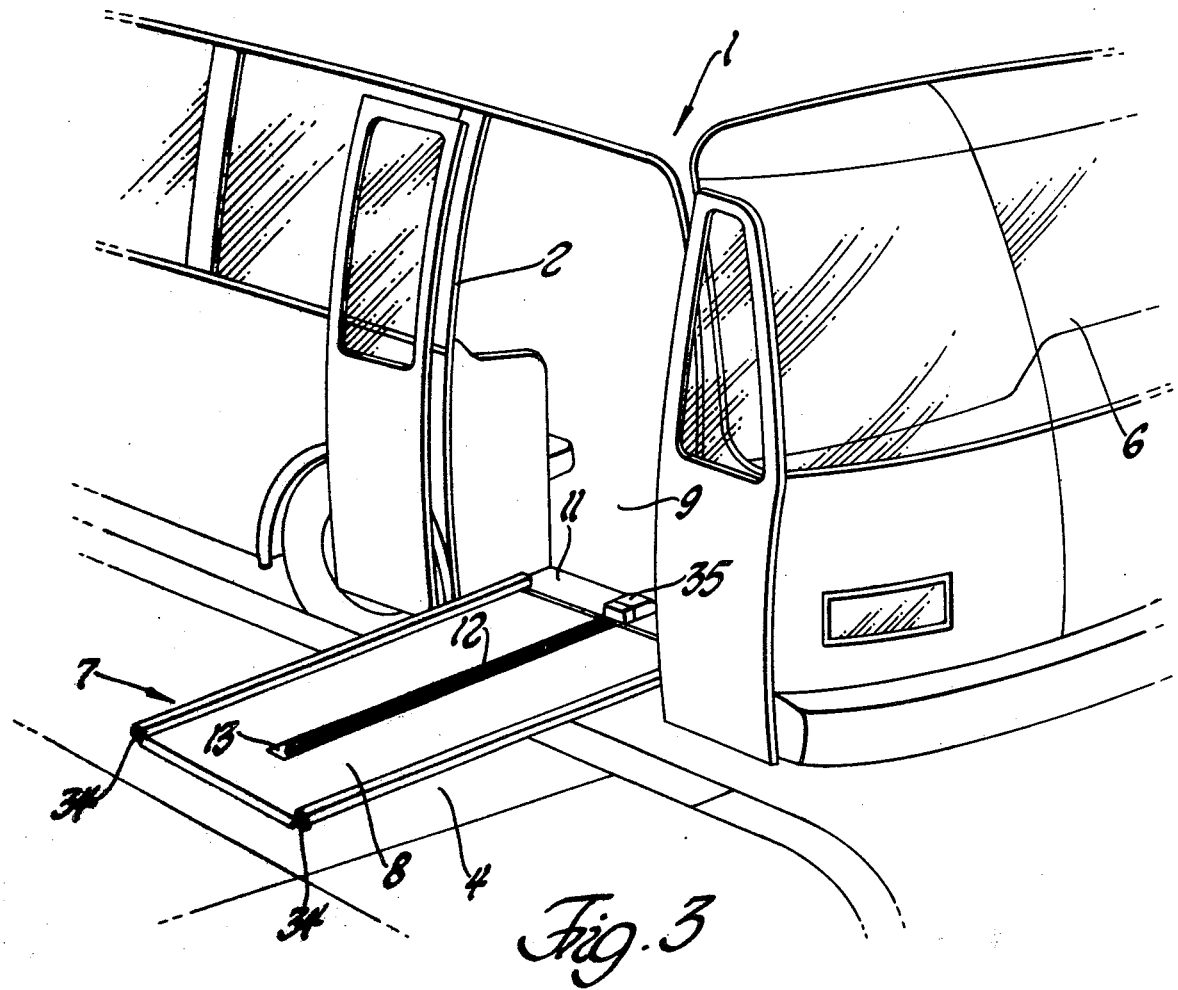
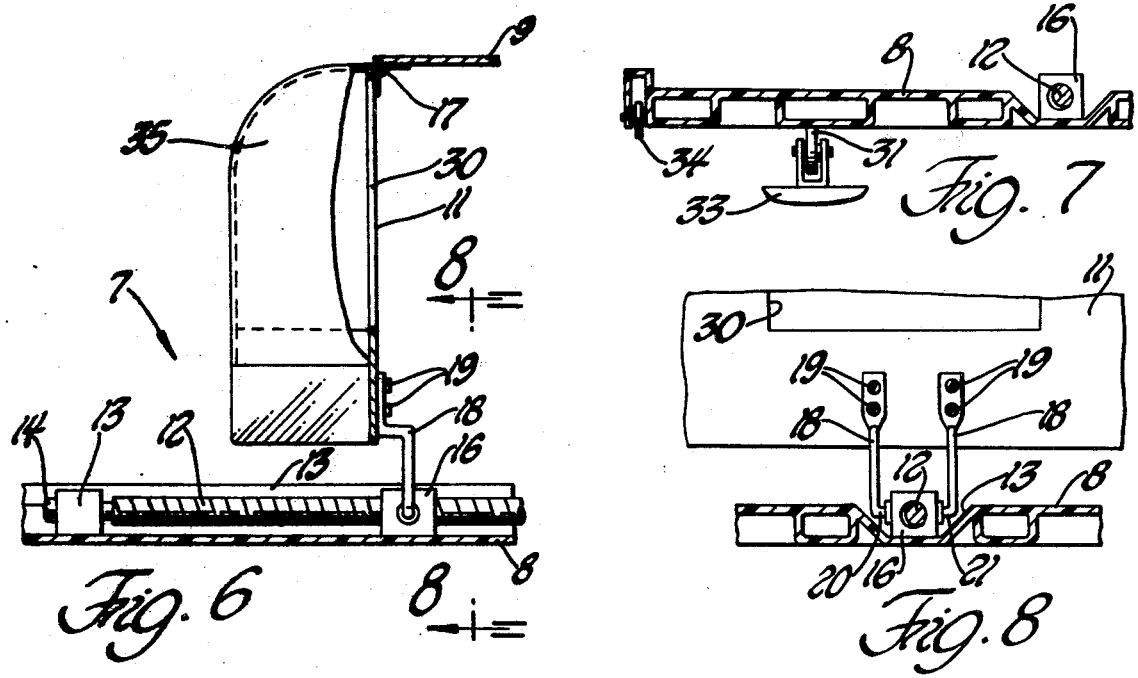

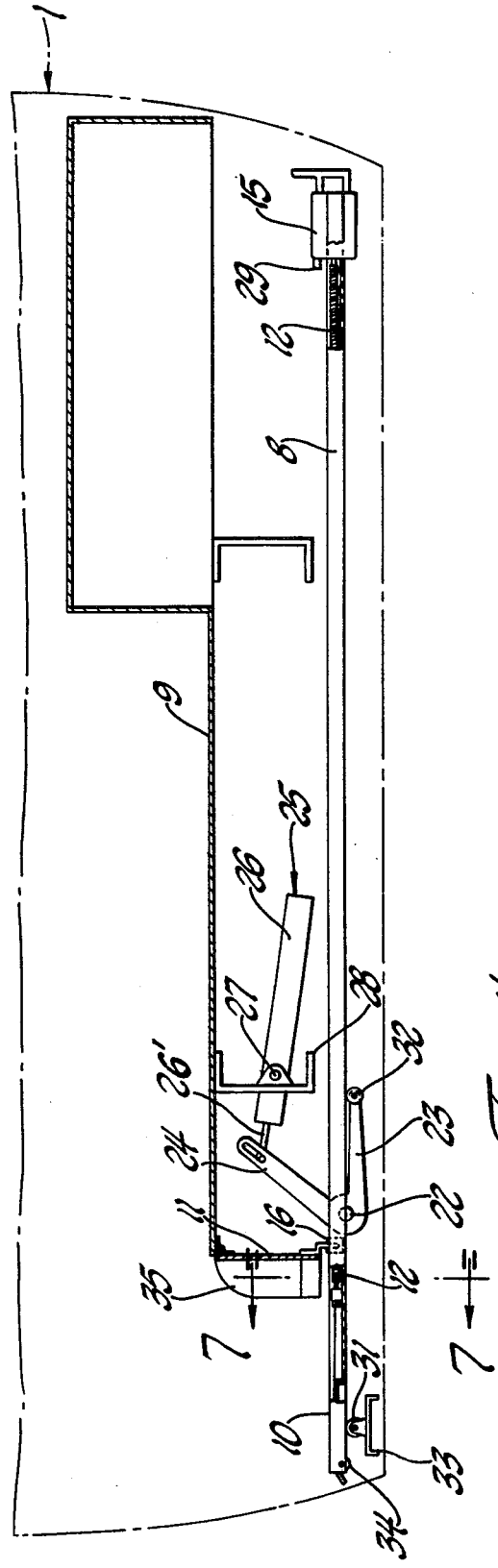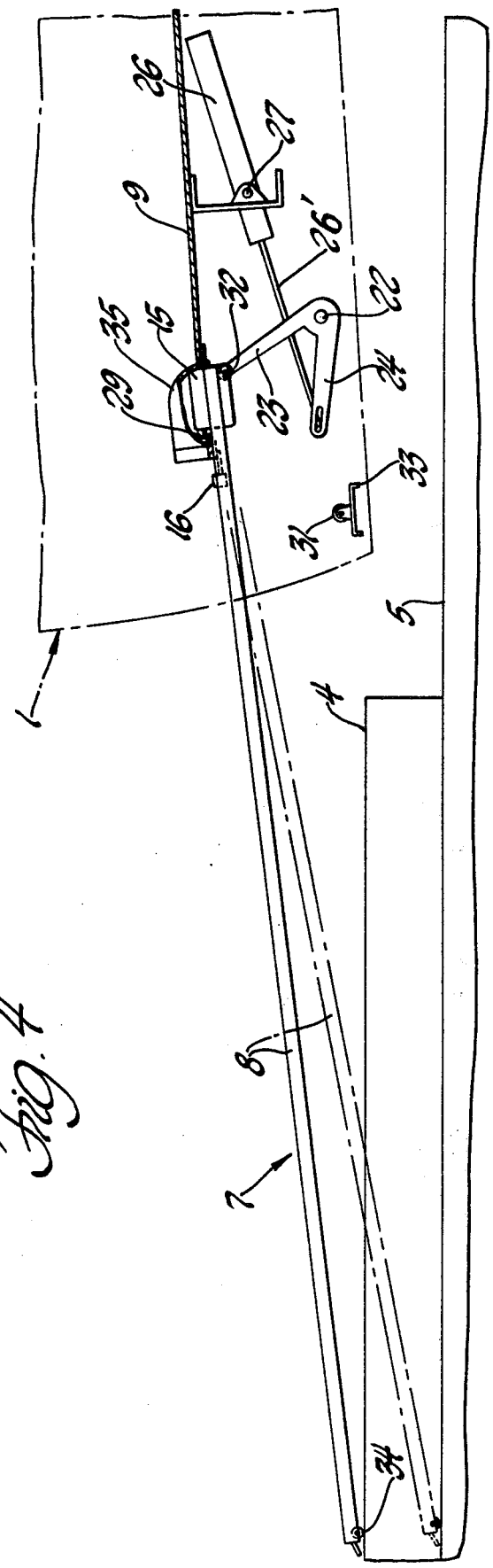
Fig. 4
Fig. 5

VEHICLE ENTRANCE RAMP

BACKGROUND OF THE INVENTION

My invention relates to vehicle entranceways and exitways and particularly to ramps associated therewith for facilitating the passage therethrough of wheelchairs and the like.

Although there has long been a need for an extendable ramp at the entranceway of a motor bus, for example, over which a wheelchair passenger may propel himself in entering or leaving the vehicle at a bus stop, no one to my knowledge has heretofore devised a practical device of this type which is power operated, simple in design and low in cost, and controllable by the vehicle operator without leaving his seat.

SUMMARY OF THE INVENTION

It is therefore among the principal objects of my invention to provide a power operated ramp to facilitate wheelchair passengers and the like in entering and leaving a vehicle, such as a motor bus; to provide such a ramp which is normally stowed below the vehicle floor adjacent an entranceway to the vehicle and, when extended, moves outwardly through the entranceway and automatically tilts upwardly toward its inner end to provide a rigid inclined platform leading to the sidewalk or roadway exteriorly of the vehicle; to provide such a ramp whose extendable end portion is spaced below the vehicle floor to serve as a step for other persons entering the vehicle when the ramp is in its stowed position; to provide such a ramp including a normally vertical step riser in the vehicle entranceway which swings upwardly about the adjacent edge of the vehicle floor to form the innermost end portion of the ramp when the ramp is in its fully extended position; and to provide such a ramp whose extending and retracting movements are power actuated by a lead screw extending longitudinally of the ramp and threadedly engaging a nut mounted to the step riser.

Although wheelchair ramps which can be manually slid out through a side doorway of a vehicle are known in the prior art, as for example the two U.S. Patents No. 1,717,303 and No. 1,884,513 to Barclay, the U.S. Patent No. 3,730,361 to Haynes, their operation was cumbersome and could only be effected from a position outside of the vehicle. Also none of these prior devices either utilized a portion of the ramp in its stowed position as a step, or provided for the step riser to swing upwardly so as to extend the ramp surface to the vehicle floor in the extended position of the ramp.

The means by which the above stated objects and advantages of my invention are realized will be clearly understood from the following description of a preferred embodiment thereof selected for purposes of illustration, having reference to the drawings, wherein:

BRIEF DESCRIPTION OF THE DRAWINGS

FIGS. 2 and 3 are views similar to FIG. 1, but showing the ramp partially and fully extended, respectively.

FIG. 4 is an enlarged view showing a portion of the bus in transverse vertical section through the entranceway, the ramp and its associated parts being seen in the stowed position of FIG. 1.

FIG. 5 is a view similar to FIG. 4 but showing the ramp fully extended with its outward end resting on a sidewalk, as seen in solid lines, or, as seen in broken lines, on the roadway adjacent the bus.

FIG. 6 is a further enlarged fragmental view, similar to FIGS. 4 and 5, but showing the riser and other associated parts of the ramp in greater detail and at positions intermediate those of FIGS. 4 and 5.

FIGS. 7 and 8 are enlarged detail sectional views taken in the directions of the arrows 7—7 of FIG. 4 and 8—8 of FIG. 6, respectively.

DESCRIPTION OF THE PREFERRED EMBODIMENT

Figure 1:
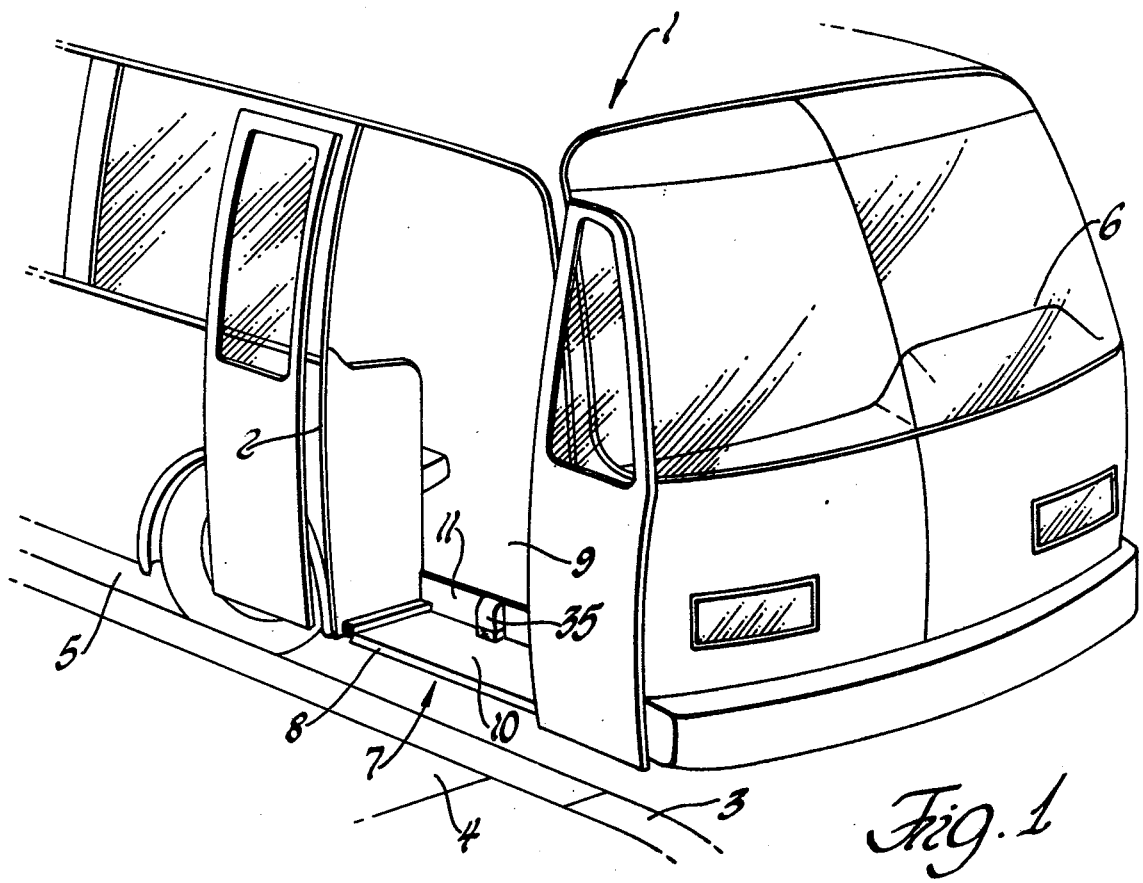
FIG. 1 is a perspective view of a motor bus having a side entranceway equipped with my improved ramp, the latter being shown in its stowed position.
Figure 2:
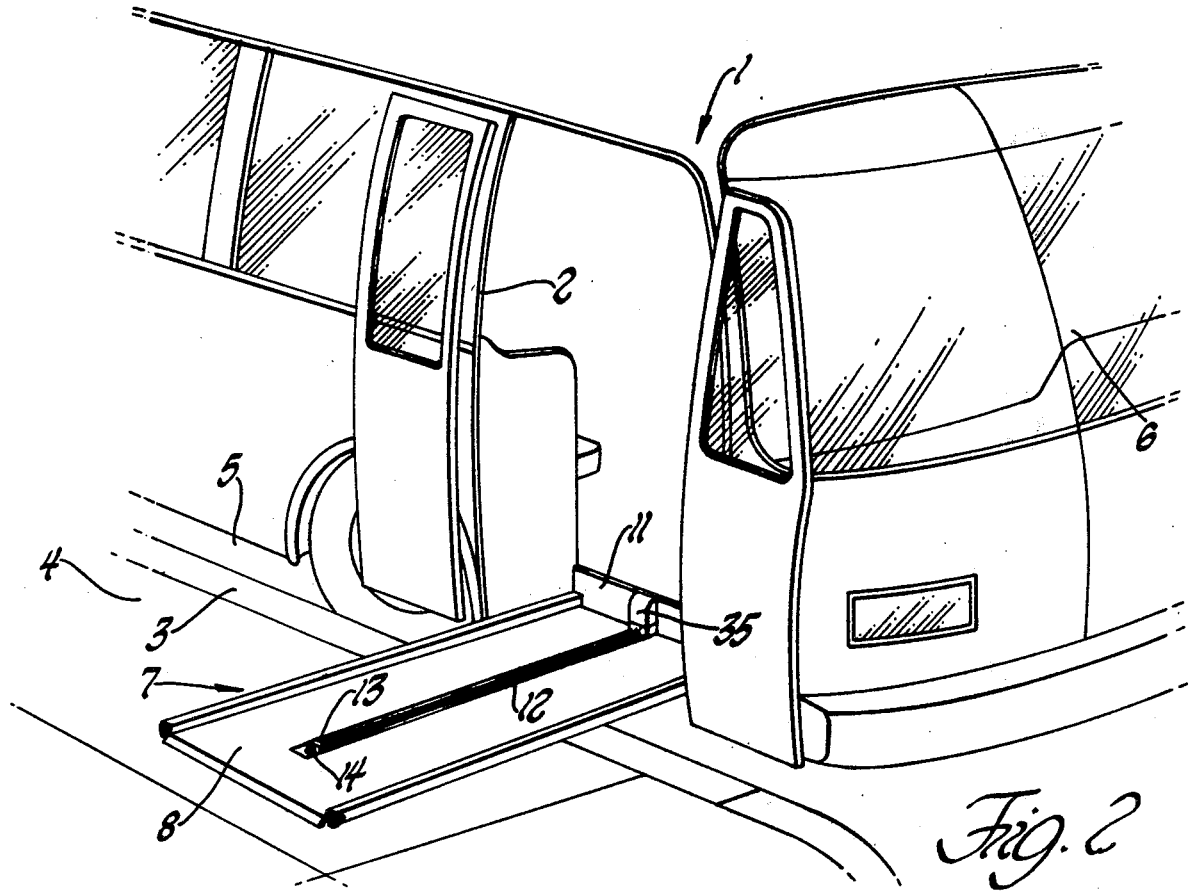

A vehicle such as a motor bus 1, whose general configuration is best seen in FIGS. 1, 2 and 3, has an entranceway or door opening 2 through which passengers may enter or leave the vehicle when it is stopped for that purpose adjacent a curb 3 and adjoining sidewalk 4 bordering the roadway 5. In the particular vehicle illustrated this door opening is located in the right hand side thereof, laterally opposite the operator's station 6 which is at the front end on the left hand side of the vehicle.

Extendable through the door opening 2, primarily for the convenience of wheelchair passengers, is a ramp which is designated generally by the numeral 7. This ramp includes a main platform-like rigid member 8 of generally rectangular shape which, in its stowed position (FIGS. 1 and 4), has the major portion of its length disposed under the vehicle floor 9. When thus stowed, however, a portion of this ramp member projects laterally outward toward the door opening to form a step 10 for use of other passengers in boarding and alighting from the vehicle. Extending between the edge of the vehicle floor laterally opposite the door opening and this step forming portion of the platform member 8 is a riser 11 which swings to a position coplanar with the member 8 as the ramp 7 reaches its fully extended position (FIGS. 3 and 5), such swinging movement of the riser being accompanied by upward tilting movement of the member 8 toward the vehicle floor.

Longitudinal movement of the ramp member 8 between its stowed and extended positions is power actuated by a lead screw 12 which is recessed within an upwardly facing groove 13, best seen in FIGS. 7 and 8, provided generally centrally in the upper face of the member 8 and extending longitudinally thereof from its innermost end. This groove terminates short of the outermost end of the ramp member 8 so as not to extend outwardly beyond the riser 11 when the ramp is in its stowed position. A thrust bearing 13, mounted to the ramp member 8 within this groove, serves to journal the outward end of the lead screw and support it against relative longitudinal movement with the member 8. The outermost end of the lead screw adjacent the bearing 13 is provided with wrench flats 14 to enable manual rotation of the lead screw in the event of a power failure.

At its innermost end the lead screw is supported and rotatively driven by a reversible rotary motor 15 which is mounted to the ramp member 8. Intermediate of the bearing 13 and motor 15 the lead screw extends through and is threadedly engaged by a nut 16 having a connection to the vehicle floor. The latter connection, as best seen in FIGS. 6 and 8, includes the riser 11 whose upper extremity has a hinged connection 17 to the vehicle floor adjacent the edge thereof nearest the door opening, and a pair of brackets 18 which are attached, as by screws 19, to the back of the riser and have oppositely inturned lower leg portions 20, 21 journalably received in circular openings provided therefor in opposite sides of the nut 16.

Suitably pivoted, as by the pin 22, to the vehicle is a bell crank having one arm 23 underlying the ramp member 8 and a second arm 24 which is connected to a power actuator 25. This power actuator is shown for purposes of illustration as being in the form of a fluid pressure motor having a cylinder 26 pivotally connected by a pin 27 to a frame member 28 of the vehicle and having a piston rod 26' pivotally connected to the bell crank arm 24, so that when fluid pressure is applied within the cylinder 26 the rod 29 will move outwardly thereof and rotate the bell crank from its position shown in FIG. 4 to the position shown in FIG. 5, thereby raising the inward end of the ramp member 8 toward the level of the vehicle floor 9. A microswitch 29 is preferably provided on the housing of the rotary motor 15, for actuation when the motor 15 moves into abutment with the back side of the riser 11 during outward actuation of the ramp member 8 by the lead screw 12. This microswitch serves to both interrupt the power supply to the lead screw motor 15 and to initiate introduction of fluid pressure to the cylinder 26 of the bell crank actuator. During the resultant upward tilting movement of the ramp member the riser 16 is also caused to swing upwardly and outwardly toward the door opening about its hinged connection 17 to the vehicle floor. Simultaneously therewith, the brackets 18, whose inturned leg portions are journalled in the nut 16, effect a further laterally outward extending movement of the ramp member 8 until the ramp member and riser reach their co-planar relation with each other seen in FIGS. 3 and 5. As best seen in FIGS. 6 and 8, the central portion of the riser has an opening 30 therein, into which the upper portion of the lead screw motor 15 is recessed when the riser and ramp member are in such co-planar relation.

Suitable anti-friction means, such as rollers 31 and 32, journalled on the vehicle side frame member 33 and on the bell crank arm 23, respectively, are provided for rollably supporting the ramp member in the vehicle. Other rollers 34 may also be journalled in the outer end of the ramp member 8 for reducing frictional drag between it and the surface of the sidewalk 4 or roadway 5 during deployment and retraction of the ramp. Also if desired, a lamp 35 may be hinged to the riser over the opening 30 therein, to both conceal the latter and illuminate the ramp member.

It will be appreciated that relatively simple circuitry (not shown) will enable control of the lead screw motor 15 by the vehicle operator from his regular seated position, whereby the lead screw may first be rotated in one direction to effect extension of the ramp for use by a wheel chair passenger desiring to leave or board the bus at a bus stop, following which the lead screw may then be rotated in the reverse direction to retract the ramp.

Although I have above described and illustrated in the drawings what is believed to be the best mode of carrying out my invention, it is recognized that various minor changes in the parts and their arrangement may be made without departing from the scope of the invention as hereinafter claimed.

The embodiments of the present invention in which an exclusive property or privilege is claimed are defined as follows:

1. In combination with a vehicle having a door opening and a floor within the vehicle opposite said opening, a ramp member movable through said opening from a stowed position within the vehicle to an extended position laterally of said floor, a lead screw journalled in the ramp member for longitudinal movement therewith through said opening, a motor mounted on the ramp member and drivingly connected to axially rotate the lead screw, a nut threadedly engaging the lead screw and connected to the floor for effecting longitudinal movement of the screw and ramp member when said motor is energized, said door opening being spaced from the adjacent lateral extremity of said floor, said ramp member in its stowed position being spaced below said floor and projecting to the door opening to form a step, a riser for said step, said riser having a hinged connection to the floor accommodating swinging movement of the riser toward the door opening, said nut being connected to the floor by said riser and having a hinged mounting on the riser accommodating said swinging movement of the riser during outward movement of the ramp member and lead screw through the door opening, and means for elevating the end of the ramp member innermost of the vehicle into substantially co-planar relationship with the riser when the ramp member has been fully extended from its normally stowed position under the floor.

2. The combination of claim 1 wherein said elevating means comprises a bell crank pivotally mounted in the vehicle below the ramp member, said bell crank having an arm extending into abutment with the underside of the ramp member, and a power actuator for rotating said bell crank in the ramp-elevating direction.

3. The combination of claim 2, including vehicle mounted roller means underlying said ramp member adjacent the door opening, and other roller means at the ramp abutting end of said bell crank arm.

4. The combination of claim 2, wherein said bell crank includes a second arm, said power actuator being mounted to the vehicle below the floor and operatively connected to said second arm for effecting rotation of said bell crank.

5. In combination with a vehicle having a door opening and a floor within the vehicle opposite said opening, a vehicle frame underlying said floor, a ramp member movable through said opening from a stowed position under said frame to an extended position laterally of said floor, a lead screw journalled in the ramp member for longitudinal movement therewith through said opening, a motor mounted on the opposite end of the ramp member and drivingly connected to axially rotate the lead screw, a nut threadedly engaging the lead screw for effecting longitudinal movement of the screw and ramp member when said motor is energized, and nut supporting means hinged to the vehicle floor and operative to tilt the ramp member upwardly and interconnect its said opposite end and the adjacent edge of the floor when the ramp member is in its extended position.

6. The combination of claim 5 wherein said door opening is spaced from the adjacent lateral extremity of said floor and wherein said ramp member in its stowed position is spaced below said floor and projects to the door opening to form a step, said nut supporting means constituting a riser for said step when the ramp member is in its stowed position.

* * * * *